United States Patent
Roessler et al.

[11] Patent Number: 5,983,853
[45] Date of Patent: Nov. 16, 1999

[54] METHOD OF PROVIDING AN IGNITABLE FUEL/AIR MIXTURE IN AN INTERNAL COMBUSTION ENGINE WITH DIRECT FUEL INJECTION

[75] Inventors: Klaus Roessler, Altbach; Stephan Kraemer, Leutenbach; Guenter Karl, Esslingen; Christian Enderle, Baltmannsweiler, all of Germany

[73] Assignee: Daimler - Benz AG, Stuttgart, Germany

[21] Appl. No.: 08/950,958

[22] Filed: Oct. 15, 1997

[30] Foreign Application Priority Data

Oct. 16, 1996 [DE] Germany ............... 196 42 653

[51] Int. Cl.⁶ ............... F02B 17/00; F02B 3/04
[52] U.S. Cl. ............ 123/295; 123/298; 123/300; 123/305
[58] Field of Search ............ 123/295, 298, 123/299, 300, 305, 478; 239/533.4, 533.5

[56] References Cited

U.S. PATENT DOCUMENTS

| | | | |
|---|---|---|---|
| 3,830,433 | 8/1974 | Miyake et al. | 239/533.5 |
| 3,987,759 | 10/1976 | Roberts et al. | 123/296 X |
| 4,327,695 | 5/1982 | Schechter | 123/504 |
| 4,495,924 | 1/1985 | Ueno et al. | 123/478 |
| 4,798,188 | 1/1989 | Ito et al. | 123/478 |
| 4,903,669 | 2/1990 | Groff et al. | 123/478 |
| 5,058,548 | 10/1991 | Morikawa et al. | 123/298 |
| 5,280,773 | 1/1994 | Henkel | 123/467 |
| 5,313,920 | 5/1994 | Matsushita | 123/300 X |
| 5,335,635 | 8/1994 | Kadoi et al. | 123/298 X |
| 5,341,783 | 8/1994 | Beck et al. | 123/446 |
| 5,479,902 | 1/1996 | Wirbeleit | 123/498 |
| 5,518,184 | 5/1996 | Potz et al. | 239/533.4 |

FOREIGN PATENT DOCUMENTS

| | | |
|---|---|---|
| 29 31 874 | 8/1983 | Germany . |
| 195 04 849 | 8/1996 | Germany . |
| 195 48 526 | 7/1997 | Germany . |
| 2 152 135 | 7/1985 | United Kingdom . |

*Primary Examiner*—Tony M. Argenbright
*Attorney, Agent, or Firm*—Klaus J. Bach

[57] ABSTRACT

In a method of providing an ignitable fuel/air mixture in the combustion chambers of the various cylinders of an internal combustion engine with direct fuel injection wherein fuel is injected into the combustion chambers by way of injectors including injection nozzles with valve members for controllably opening and closing the injection nozzles, the valve member opening strokes and the valve member opening times are variably adjusted depending on specific engine operating conditions.

9 Claims, 5 Drawing Sheets

METHOD OF PROVIDING AN IGNITABLE FUEL/AIR MIXTURE IN AN INTERNAL COMBUSTION ENGINE WITH DIRECT FUEL INJECTION

BACKGROUND OF THE INVENTION

The invention relates to a method of providing an ignitable fuel/air mixture in the cylinders of an internal combustion engine with direct fuel injection, wherein the fuel is injected into the engine combustion chambers by way of an injector including an injection nozzle normally closed by a valve member seated on a valve seat of the injector.

DE OS 43 24 642 A1 discloses an internal combustion engine with direct fuel injection which includes in each cylinder a combustion chamber limited by a piston. A fuel injector is disposed centrally in the top of the combustion chamber to inject fuel into the combustion chamber in a spray beam forming in the combustion chamber an ignitable fuel/air mixture. The electrodes of a spark plug project into a fuel spray beam in the vicinity of the nozzle opening of the injector such that, during low load operation of the internal combustion engine where the engine is operated under stratified charge conditions, the combustion is maintained stable by igniting a fuel-rich mixture in the vicinity of the electrodes of the spark plug. The fuel-rich mixture is provided by injection of the fuel during a later phase of the compression stroke of the piston. The internal combustion engine includes an electronic control unit, which controls the amount of fuel injected by the injector and also the injection timing and the ignition timing for optimal engine operation. The ignition characteristics can be influenced by way of predetermined factors such as injection pressure, shape, and size of the injection nozzle opening, shape of the combustion chamber, compression ratio and so on.

These possible variations of the injection parameters however are, under many operating conditions, not sufficient to insure the optimization of the internal mixture formation with respect to low fuel consumption and low noxious emissions particularly during stratified charge engine operation which occurs over a wide range of the engine performance graph.

It is therefore the object of the present invention to provide a method of generating an ignitable fuel/air mixture in internal combustion engines with direct fuel injection, wherein the internal mixture formation can be optimized under all engine operating conditions and, particularly during stratified charge engine operation.

SUMMARY OF THE INVENTION

In a method of providing an ignitable fuel/air mixture in the combustion chambers of the various cylinders of an internal combustion engine with direct fuel injection wherein fuel is injected into the combustion chambers of the cylinders by way of injectors including fuel injection nozzles with valve members for controllably opening and closing the fuel injection nozzles, the valve member opening strokes and the valve member opening times are variably adjusted depending on specific engine operating conditions.

Since, with the method according to the invention, the lifting stroke of the injector valve member relative to the valve seat and the injection time can be controlled, a number of advantages are achieved. Basically, it is possible to control with a particular corresponding opening stroke of the valve member a particular fuel amount by varying the duration of the injection period. In this way, the internal mixture formation, that is, during stratified charge engine operation the fuel concentration, or respectively, the air condition (lambda values) of the mixture cloud formed in the combustion chamber by the fuel injection spray pattern, can be controlled by way of the injection time. The fuel is injected by the injector preferably in a cone-like spray pattern whereby, depending on the injection timing during stratified charge engine operation, a mixture cloud with different lambda values corresponding to the angle of the cone-like injection pattern of the fuel spray is formed in the combustion chamber. By providing an adjustable valve member stroke, the cone angle of the cone-like fuel injection spray pattern is also variably adjustable.

Preferably, the cone angle of the fuel injection spray pattern increases with increasing opening stroke of the valve member. In this way, the characteristic of the cone-like fuel spray pattern, which may be different for different injectors, may be adapted so as to achieve optimum operating conditions for the internal combustion engine. The different spray pattern characteristics occur because of tolerances in the series manufacture of the injectors or of the cylinderheads etc., but also as a result of wear or the formation of deposits, which develop with increasing engine operating times. They can result in a streak-like spray pattern, which leads to undesirable lambda values, and detrimentally affect the combustion, particularly in the area of the spark plug, because of an undesirable positioning of the mixture cloud in the combustion chamber. The variably adjustable opening stroke of the valve member facilitates the provision of an ignitable fuel/air mixture at the electrodes of the spark plug for each operating point of the internal combustion engine.

Preferably, the opening stroke of each valve member is individually adjustable so that the fuel spray pattern characteristics of the injectors can be individually adjusted, that is, different fuel injection cone angles can be provided in different cylinders in order to obtain optimal operating conditions.

Preferably, the opening strokes of the valve members are adjustable during the injection process such that the injection cone angle can be dynamically changed and also the fuel mass flow through the injection nozzle can be adjusted. An increase of the fuel injection spray cone angle during injection also permits a corresponding selection of the beginning of the ignition, since then a combustible mixture is formed in the vicinity of the electrodes of the spark plug. The wetting of the electrodes with fuel and the carbon formation resulting from the combustion of the fuel on the electrodes are minimized and the life of the spark plug is consequently increased. A reduction of the opening stroke of the valve member and the resulting smaller fuel mass flow through the injection nozzle opening permits the formation of mixture clouds with optimal Lambda gradients or essentially constant air conditions. This can not be achieved with a constant fuel mass flow with a uniform opening stroke where in the areas remote from the fuel injection nozzle, lean mixtures with high Lambda values are present in the mixture cloud.

The opening stroke of the valve member and the injection time are adjusted so as to achieve a consumption- and emission-optimized operation of the internal combustion engine on the basis of the adjustment parameters of the opening stroke of the valve member and the fuel injection time deposited for a respective engine operating point in an injection performance graph. During operation of the internal combustion engine with the adjusted parameters of the opening stroke of the valve member and the injection time, engine parameters such as engine running smoothness are measured and compared with the desired values deposited for every engine operating point in an engine performance graph. Deviations of the measured engine parameters from the desired values deposited in the engine performance graph may occur when the engine is first placed into operation. These deviations may be the result of tolerances in the series production of the components involved in the fuel injection system. They may also be the result of wear or deposits occurring after extended engine operation. If engine operating smoothness is not satisfactory, the opening stroke of the injection valve member is changed until an optimal operating behavior with the measured engine parameters in accordance with the desired values of the engine performance graph is achieved. The ideal parameters developed in this way are deposited in the injection performance graph and replace the adjustment parameters so far on record for the engine particular operating point. When this engine operating point is then again reached, the newly recorded ideal parameters for the adjustment of the opening stroke of the valve member and for the injection time are utilized.

The method according to the invention is particularly suitable for forming the internal mixture of gasoline engines. The opening stroke of the valve member is generally maximally 0.1 mm. This permits, with a still relatively small stroke and a relatively large fuel flow, short opening times. During stratified charge operation of the internal combustion engine, the opening stroke of the valve member is adjustable generally between 0.02 and about 0.06 mm. This permits the formation of mixture clouds in the combustion chamber with different air conditions, which provide for a consumption- and emission-optimized stratified charge combustion. The fuel injection cone angle, which depends on the opening stroke of the valve member is preferably between 70° and 100°. It makes sure that the electrodes of a spark plug which are arranged outside the center area of the combustion chamber extend into the mixture cloud also during stratified charge operation and that the mixture cloud is reliably ignited while only little deposits form on the spark plug electrodes as a result of being wetted by fuel. The factor injection time which is controlled by the opening period of the injection nozzle permits the control of the internal mixture formation at any operating point of the internal combustion engine by the injection of a selectable fuel amount with a particular opening stroke of the valve member.

This is to say that, during stratified charge operation, it permits the control of the mixture cloud. If several fuel injections into the combustion chamber occur in a single engine operating cycle, the method provides for additional possibilities of influencing the internal mixture formation. The method of forming such an ignitable fuel/air mixture with direct fuel injection can be performed, for example, using an injector as it is described in German patent document DE 195 48 526.

The invention will be described in greater detail on the basis of the accompanying drawings.

DESCRIPTION OF A PREFERRED EMBODIMENT

Figure 1:
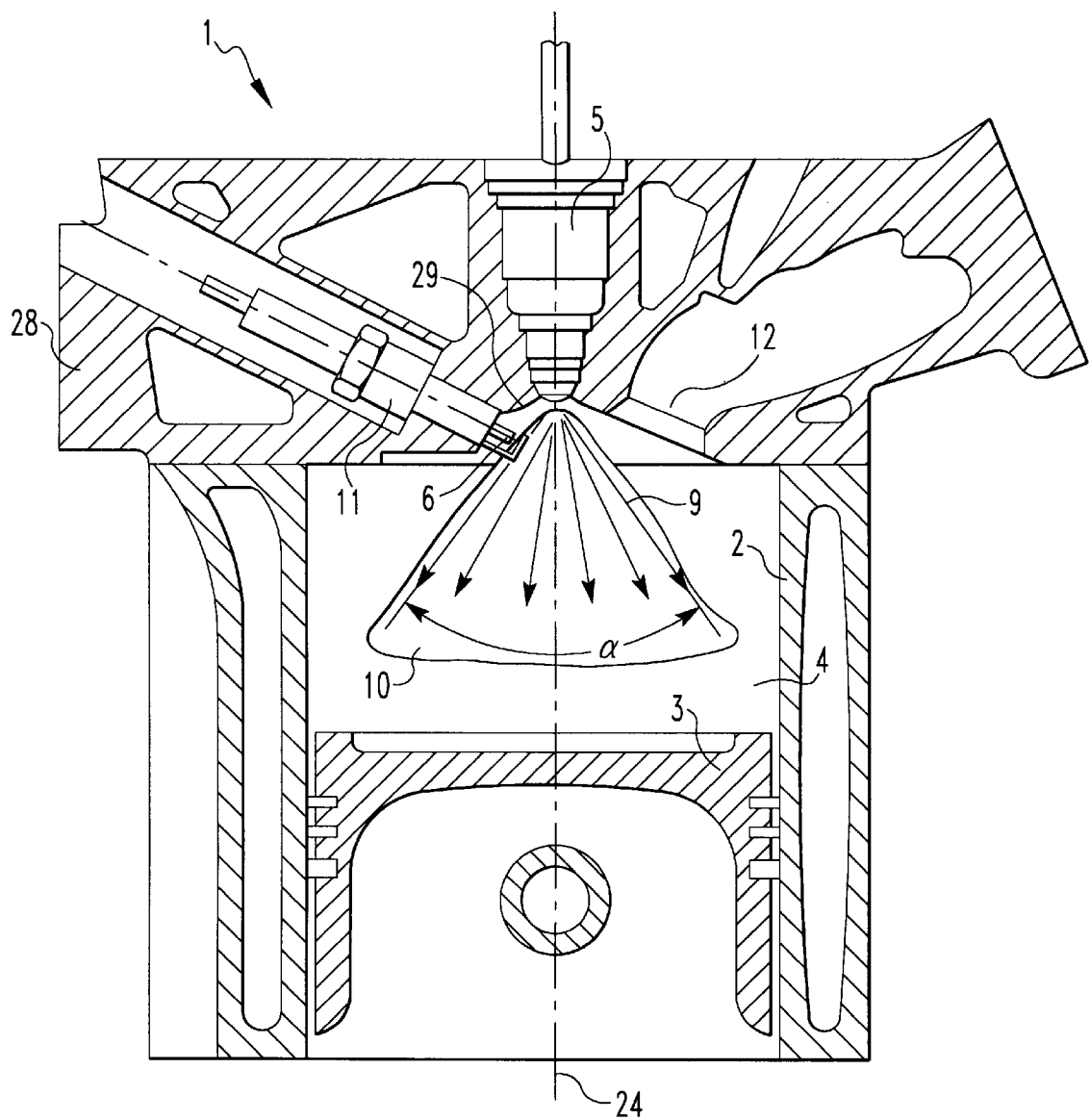
FIG. 1 is a cross-sectional view of a cylinder of an internal combustion engine with direct fuel injection.

FIG. 1 shows the cylinder 2 of an internal combustion engine 1 with direct fuel injection, wherein a longitudinally movable piston 3 delineates, together with a cylinderhead 28, a combustion chamber 4. An injector 5 is mounted in the cylinderhead 28 centrally along the longitudinal axis 24 of the cylinder 2 so as to extend through the cylinderhead 28 such that the injection nozzle 6 of the injector 5 projects into the combustion chamber 4 in the center of a conical combustion chamber ceiling 29. A control unit (which is not shown) determines for every operating point of the internal combustion engine 1 specifically the point of time at which, depending on the position of the piston 3 in the cylinder 2, the injection nozzle 6 is to be opened so that fuel is injected into the combustion chamber 4 in a conical fuel spray pattern 9. The injection cone angle α of the conical spray pattern 9 is determined by the opening stroke of a valve member 7 disposed in the injection nozzle 6. With the fresh air introduced into the combustion chamber 4, and the fuel injected, an ignitable mixture is formed in the combustion chamber. During stratified charge operation of the internal combustion engine 1 with fuel injection during the compression stroke of the piston 3, this mixture is present in the form of a mixture cloud 10 which has the shape of the conical fuel spray pattern 9 and which has different air conditions (lambda values) in different sections.

A spark plug 11 is mounted in the cylinderhead 28 so that it extends into the combustion chamber 4 at one side of the combustion chamber ceiling 29 such that the electrodes of the spark plug 11 extend into the mixture cloud 10 and are able to ignite the mixture cloud 10 at its edge by a spark. It is possible that, by the formation of streaks in the fuel spray pattern 9 or because of manufacturing tolerances of the injector 5, the injection nozzle 6 or the cylinderhead 18, etc., or by wear or the formation of deposits on the electrodes of the spark plug 11 or in the opening of the injection nozzle 6, there is no ignitable mixture at the electrodes of the spark plug 11. Then the location of the mixture cloud 10 in the combustion chamber 4 can be changed by changing the injection fuel cone angle α such that an ignitable mixture is provided at the electrodes.

Figure 2:
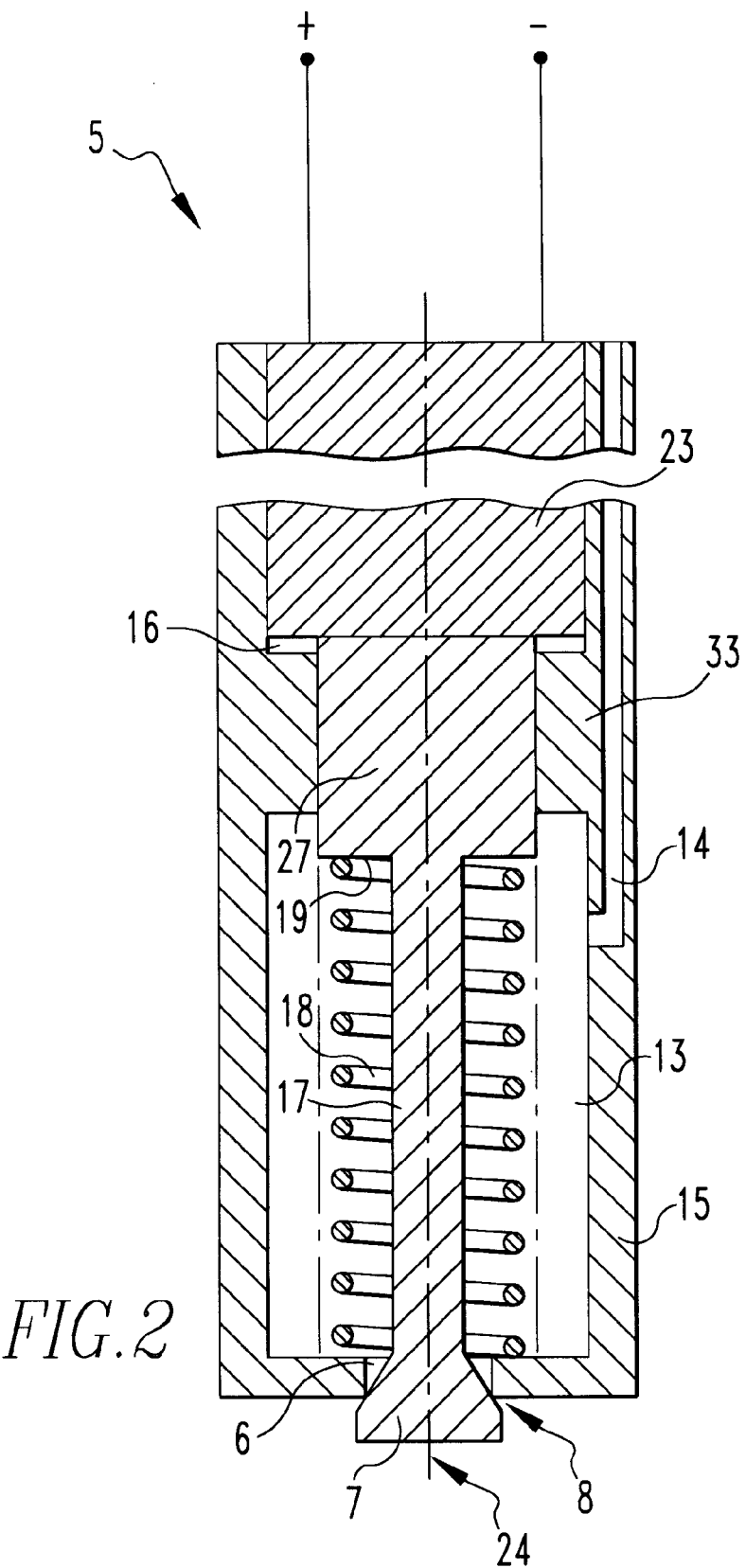
FIG. 2 is a cross-sectional view of an injector.

FIG. 2 shows, in a cross-sectional view, schematically, an injector 5 with which the method according to the present invention for providing an internal mixture can be performed. The injector 5 includes a cylindrical injector housing 15 with a longitudinal axis 24 and a fuel chamber 13 through which a valve shaft 17 extends. The valve shaft 17 has a conical end forming a valve member 7 which engages a valve seat 8 formed on the soffit of a nozzle opening 6. With an axial displacement of the valve shaft 17, the valve member 7 lifts off the valve seat 8, whereby the nozzle opening is unblocked for the discharge of fuel present in the fuel chamber 13 under high pressure. The opening stroke of the valve member 7 and the duration of unblocking of the injection nozzle opening 6 (injection time) determines, within the frame of internal mixture formation, the fuel flow through the nozzle opening 6 as well as the total injection amount and the injection angle of the fuel beam cone leaving the nozzle opening 6. This cone-shaped fuel beam influences particularly the mixture formation during stratified charge operation of the internal combustion engine by the shape of the mixture cloud formed thereby in the combustion chamber.

Opposite the valve member 7, the valve shaft 17 is provided with a shoulder 19 formed on a pressure piston 27, which is supported in a guide structure 33 projecting inwardly from the injector housing 15 and limiting the fuel chamber 13. The pressure piston 27 extends into an elongation chamber 16, which is disposed in the injector housing 15 adjacent the end of the guide structure 33 opposite the fuel chamber 13. The elongation chamber 16 includes a mechanical converter arrangement for converting the electric impulses. The converter arrangement may be, for example, a piezo element 23, which is disposed in abutting engagement with the end section of the pressure piston 27 projecting into the elongation chamber 16. Upon applying a voltage to the piezo element 23, its full length increases whereby the pressure piston 27 is moved and the injection nozzle is opened thereby permitting the discharge of fuel from the fuel chamber 13. The elongation of the piezo element 23 is, in accordance with the piezo electric effect, proportional to the voltage applied. Accordingly, the opening stroke of the valve member 7 can be exactly and variably controlled by the voltage applied to the piezo element 23.

For closing the injection nozzle opening 6, the electric voltage applied to the piezo element 23 is reduced, whereby the piezo element 23 becomes shorter. A compression spring 18 disposed in the fuel chamber 13 between the annular shoulder 19 of the pressure piston 27 and the inside of the injector housing 15 adjacent the nozzle opening 6 returns the valve member 7 toward the valve seat 8. If the internal combustion chamber includes a common rail fuel injection system, wherein the fuel chamber 13 in the fuel injector housing is under high pressure by a fuel supply line, the return force returning the valve member 7 to the valve seat 8 for closing the nozzle opening 6 is generated by providing the pressure piston 27 with a larger diameter than the nozzle opening 6. The larger surface area of the pressure piston 27, which is subjected to the high fuel pressure, moves the pressure piston 27 with the valve shaft 17 in a valve closing direction. The voltages required for controlling the opening stroke of the valve member 7 are greater by the amount of an electric voltage which is necessary to overcome the force generated by the pressure effective on the differential surface of the pressure piston 27, which moves the valve member into closing direction.

Figure 3:
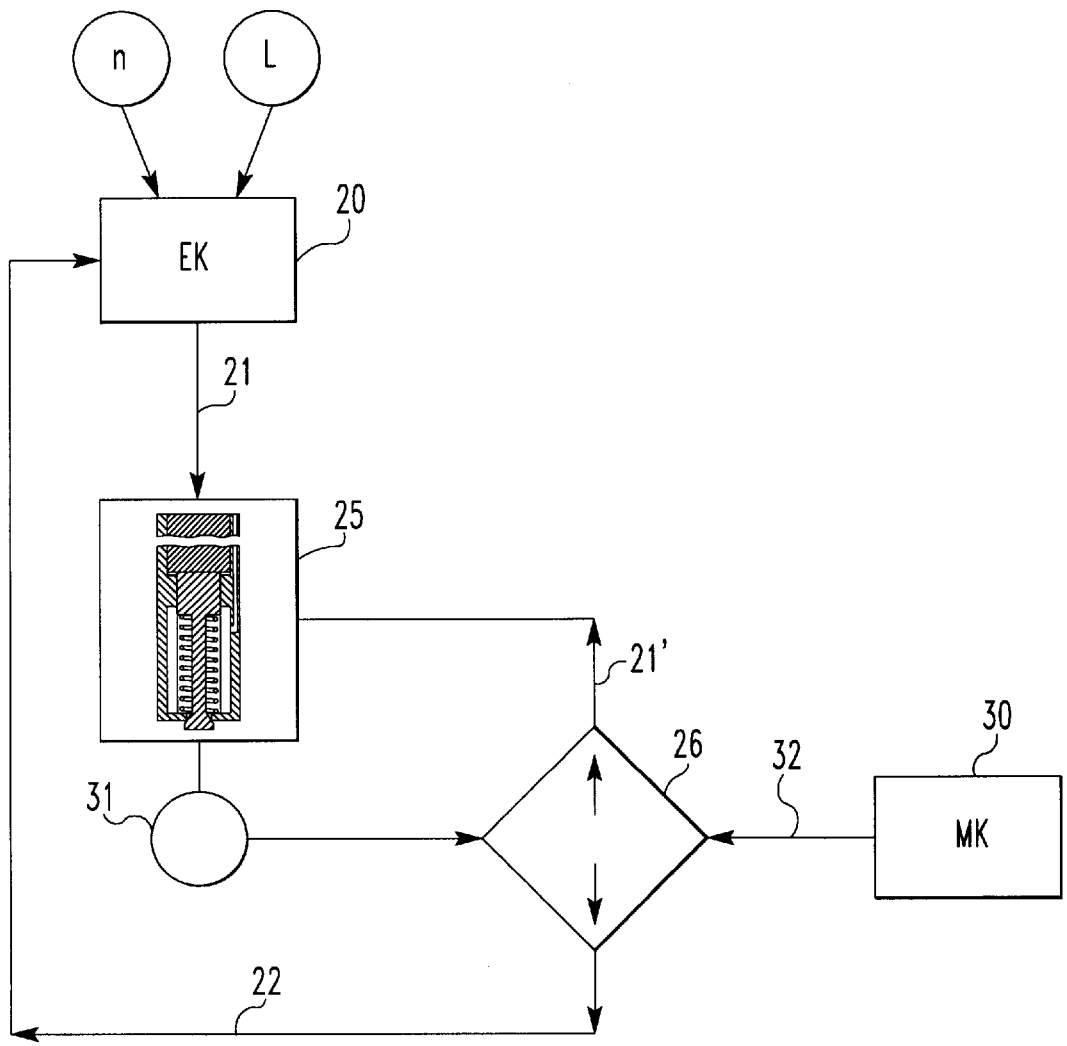
FIG. 3 shows a diagram for the control of an injector.

FIG. 3 shows schematically a control arrangement for the opening stroke of a valve member and the injection time for providing an optimum mixture at any operating point of an internal combustion engine by an injector control 25. For each operating point of the internal combustion engine, which is determined by a number of revolutions (rpm) and a load L, the respective optimal setting parameters 21 for the opening stroke of the valve member and the injection time are recorded in a performance graph 20. At any operating point of the internal combustion engine, the respective setting parameters 21 are taken from the performance graph 20 and used by the injector control 25 for adjusting the opening stroke and the injection time for a consumption- and emission-optimized operation of the internal combustion engine.

The adjustment parameters 21 of the various cylinders of a multi-cylinder internal combustion engine recorded in the injection performance graph 20 may be different for the various cylinders and provide for cylinder-specific mixtures in the various combustion chambers. After adjustment of the injectors by the injector control 25, the engine operating parameters 31, such as engine running smoothness, are measured and compared in a control unit 26 with engine operation point-specific desirable values 32 recorded in an engine performance graph 30. If the measured engine operating parameters 31 deviate from the desired values 32 recorded in the engine performance graph 30, that is, for example, the engine running smoothness is not satisfactory, the control unit 26 varies the engine adjustment parameters 21. The new adjustment parameters are then used by the injector control 25 in the following engine operating cycles as the basis for the control of the injectors. If, after continuing comparisons of the measured engine operating parameters 31 with the desired values 32 of the engine performance graph 31, concurrence is achieved, while the engine operating behavior is optimal, the changing of the parameters by the control unit is terminated. The determined ideal parameters 22 for providing an optimal fuel mixture in the particular engine operating point are recorded in the performance graph 20 and replace the values recorded so far for this particular engine operating point. When the engine reaches the particular operating point the next time, the corrected ideal parameters 22 are then provided to the injector control 25.

Such corrections of the adjustment parameters 21 may for example be necessary when the internal combustion engine is placed into operation for the first time because of tolerances in the mass manufacture of injectors, cylinderheads, etc., which, during stratified charge engine operation, prevent the formation of an ideal mixture cloud as they adversely affect the fuel spray cone. They may also be necessary when the fuel spray cone changes because of wear or the formation of deposits after extended operation of the internal combustion engine. Upon correction of the adjustment parameters 21, an increase of the opening stroke of the valve member 7 leads to an increase of the cone angle of the injection spray pattern. During stratified charge operation of the engine, the deviations of the air conditions (lambda values) and of the position of the mixture cloud in the combustion chamber can therefore be accommodated to provide for an optimal mixture formation. A check of the operating behavior of the internal combustion engine, that is, a comparison of the measured engine operating parameters 31 (engine running smoothness) with the desired values 32 of the engine performance graph 30 can be performed during operation of the engine continuously or at predetermined intervals.

Figure 4:
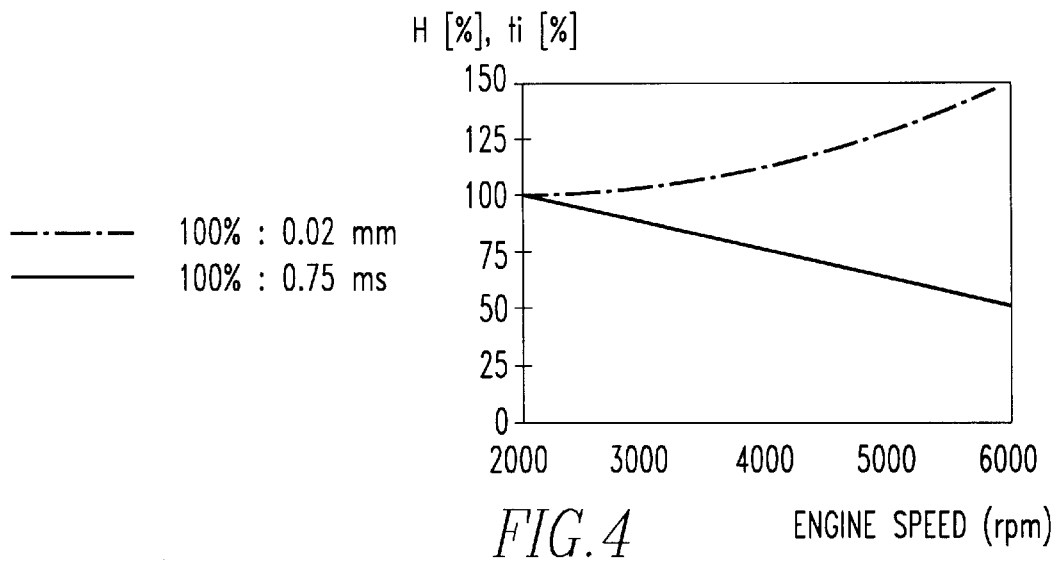
FIG. 4 shows the injector adjustment parameters depending on engine speed.

FIG. 4 shows in a diagram the adjustment parameters for the opening stroke of the valve member and the injection time depending on the speed (rpm) of the gasoline engine with direct fuel injection. During stratified charge operation of the internal combustion engine, the engine speed affects the location of the mixture cloud in the combustion chamber. Consequently, for achieving an optimum mixture over the full performance graph, the adjustment parameters opening stroke and, respectively, injection time, need to be adapted to each other. The mixture formation is adjusted such that, with increasing engine speed, the valve opening stroke is increased exponentially, while the injection time is reduced linearly. At an operating point with an engine speed of 2000 rpm, the optimal injection time is, for example, about 0.75 ms with an opening stroke of 0.02 mm, whereas, at an engine speed of 6000 rpm, the optimal adjustment parameters are 0.375 ms for the injection time and 0.03 mm for the valve opening stroke.

Figure 5:
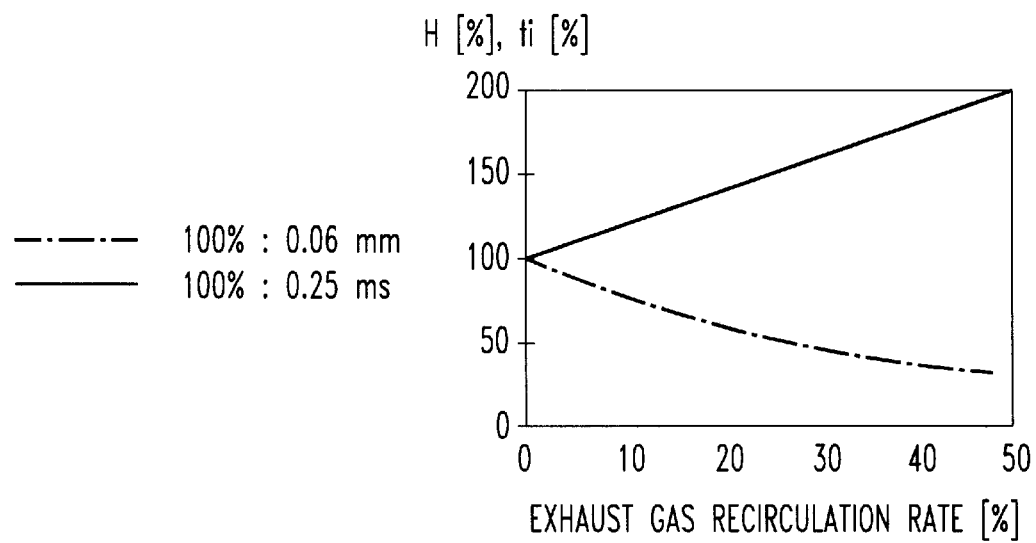
FIG. 5 shows the injector adjustment parameters depending on the exhaust gas recirculation rate, that is, the throttling of the internal combustion engine.

FIG. 5 is a diagram giving the adjustment parameters for optimal mixture formation in the performance graph of an internal combustion engine having a reduced oxygen concentration in its combustion chamber.

These operating conditions apply when exhaust gas is recirculated or partial throttling is employed, for example, for a clean-out burning of the combustion chamber or to improve the conditions for the treatment of the exhaust gases. The reduced fresh air mass flow, as well as its temperature and furthermore the changed pressure conditions in the combustion chamber require an adaptation of the mixture formation by changing the injection parameters in the performance graph.

In this case, with an increasing exhaust gas recirculation rate, and, respectively, partial throttling, the injection time is linearly increased and the valve opening stroke is inverse-exponentially reduced. In an operating point without exhaust gas recirculation or, respectively, during unthrottled engine operation, the optimal adjustment parameters are, for example, 0.25 ms injection time and 0.06 mm valve opening stroke, whereas at an engine operating point with an exhaust gas recirculation rate, or respectively, a partial throttling of 50%, the injection time is 0.5 ms and the valve opening stroke is 0.025 mm.

Figure 6:
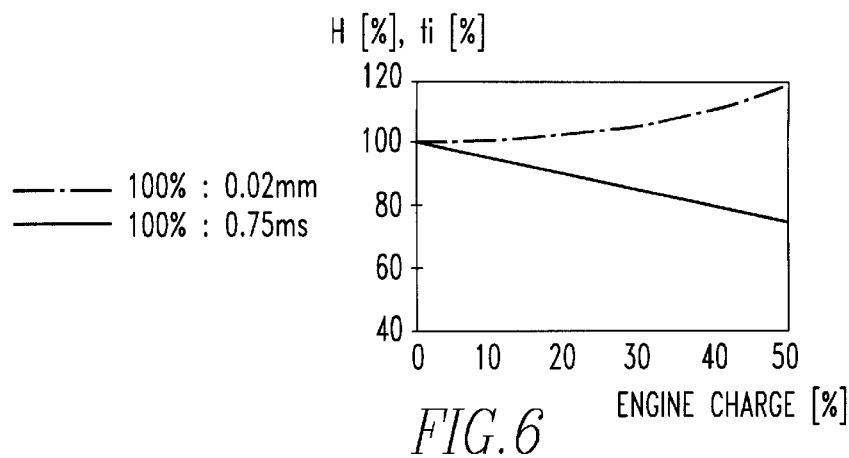
FIG. 6 shows the injector adjustment parameters depending on the charge of the engine.

FIG. 6 is a diagram showing the optimal adjustment parameters in a performance graph for a charged internal combustion engine, where it is important to distribute the injected fuel in only a small combustion chamber area. Accordingly, with increasing engine charging, the opening stroke is increased exponentially and the injection time is reduced linearly whereby a mixture cloud with optimal lambda values is formed over the whole performance graph of the internal combustion engine. The valve opening stroke is increased under these circumstances from 0.02 mm at 0% engine charging to about 0.025 mm at 50% engine charging whereas the injection time is reduced in the same performance graph range from 0.75 ms to about 0.6 ms.

Figure 7:
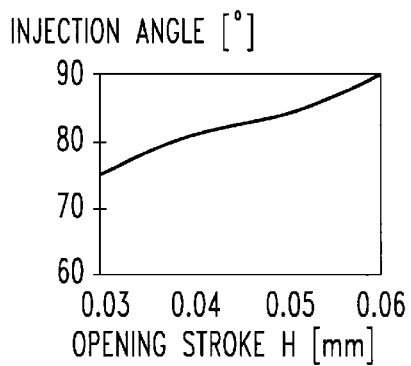
FIG. 7 shows the angle of the injection fuel spray cone depending on the opening stroke of the valve member.
Figure 8:
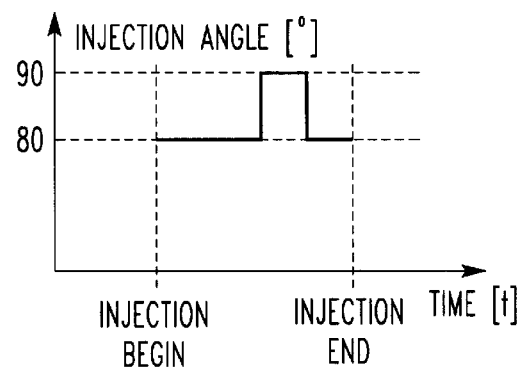
FIG. 8 shows the variation of the injection spray cone angle during the injection time.

The diagram of FIG. 7 shows the increase of the cone angle of a fuel injection spray cone from about 75° to about 90° with the valve opening stroke of a valve member increasing from about 0.03 mm to 0.06 mm when the valve member is lifted off the seat of the injection nozzle opening of an injector. In this way, it can be made sure that, during stratified charge operation in every engine operating point, the electrodes of a spark plug extending into the combustion chamber are exposed to an ignitable fuel/air mixture. After completion of the fuel injection, the mixture cloud moves in the combustion chamber in the direction toward the piston so that there is a chance that the mixture becomes in the area of the electrodes so lean as to have lambda values with which ignition is impossible. It is therefore preferable that, under certain conditions, the fuel injection spray cone angle is increased, although the spark plug electrodes are wetted and some deposits may be formed thereby on the electrodes in order to provide a combustible mixture in the vicinity of the electrodes. Such a procedure with which also the ignition timing is selected is shown graphically in FIG. 8. Here, the fuel injection spray cone angle is increased during the injection period by shortly increasing the valve opening stroke. In dynamically changing the injection cone angle during the injection time, a fuel-rich mixture is provided at the electrodes for a short time at which time also ignition is initiated. Outside the short ignition period so provided wherein a fuel spray cone angle of about 90° is generated, the fuel injection spray cone angle has a smaller value of about 80°, whereby the electrodes are not wetted. As a result the formation of deposits is limited.

Figure 9:
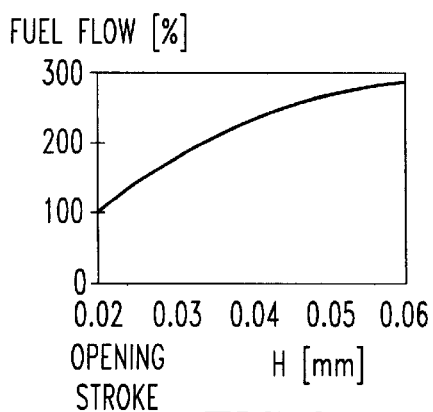
FIG. 9 shows the fuel flow through the injector nozzle depending on the opening stroke of the valve member.
Figure 10:
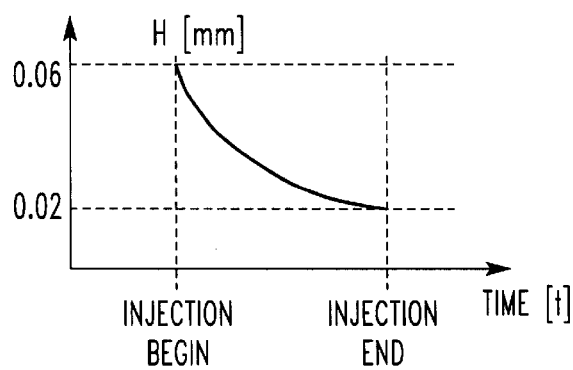
FIG. 10 shows the change of the opening strokes during the injection period.

FIG. 9 shows in a diagram the inverse-exponentially increased flow rate of an injection nozzle depending on an increasing opening stroke of the valve member. With a constant opening stroke, wherein a uniform fuel-mass flow would be injected into the combustion chamber, there would be, during stratified charge engine operation, a relatively rich fuel/air mixture in the mixture cloud in the vicinity of the injection nozzle whereas the mixture would be relatively lean in the areas remote from the fuel injection nozzle. In order to prevent the mixture cloud from becoming excessively lean in the areas remote from the fuel injection nozzle, whereby the oxidation of the fuel may become incomplete because of excess air, the fuel mass flow is reduced during the opening period of the injection nozzle. This is done, as shown in FIG. 10 by dynamically reducing the nozzle opening stroke from about 0.06 mm at the beginning of the fuel injection to 0.02 mm at the end of the fuel injection period just before the closing of the fuel injection nozzle. The opening stroke is reduced during the fuel injection period in an inverse-exponential fashion such that the major part of the metered fuel amount is injected into the combustion chamber through the injection nozzle at a high mass flow rate at the beginning of the injection period.

What is claimed is:

1. A method of providing an ignitable fuel/air mixture in combustion chambers delineated by pistons in cylinders of an internal combustion engine with direct fuel injection wherein the fuel is injected into the combustion chambers by way of injectors including injection nozzles with valve members movably disposed in the injectors for controllably closing and opening the injector nozzles, said injector valve members having a valve opening stroke and a valve opening time, said method comprising the step of variably adjusting said valve opening stroke and said valve opening time depending on engine operating conditions, injecting fuel into said combustion chamber in a cone-shaped spray pattern and, during stratified charge engine operation, controlling said cone-shaped spray pattern so as to form a fuel/air mixture cloud into which the electrodes of a spark plug mounted into said cylinderhead extend and which has air conditions which depend on the adjustment of the opening stroke of the injection valve member.

2. The method according to claim 1, wherein the opening stroke said valve member of each cylinder is individually adjusted.

3. The method according to claim 1, wherein said fuel is injected such that said cone-shaped spray pattern has an injection cone angle ($\alpha$), which increases with increasing opening stroke of said valve member.

4. The method according to claim 1, wherein the opening stroke of said valve member and the injection time are adjusted for each operating point of the internal combustion engine based on adjustment parameters recorded in a fuel injection performance graph.

5. The method according to claim 4, wherein, for each engine operating point, engine operating parameters are measured and compared with desired values recorded in an engine performance graph and, when the measured parameters differ from the desired parameters, the opening stroke of the valve member is adjusted until an optimal engine operation is achieved wherein the measured engine operating parameters coincide with the desired engine operating parameters and the so determined ideal parameters are recorded in the injection performance graph replacing the previously recorded ignition performance parameters.

6. The method according to claim 1, wherein the opening stroke of the valve member is maximally 0.1 mm.

7. The method according to claim 6, wherein, during stratified charge operation of the internal combustion engine, the opening stroke of the valve member is adjusted to be between about 0.02 mm and about 0.06 mm.

8. The method according to claim 1, wherein the fuel injection spray cone angle ($\alpha$) is controlled dependent on the opening stroke of the valve member to assume a value of between about 70° and 100°.

9. The method according to claim 1, wherein fuel is injected into said combustion chamber more than once during each engine operating cycle.

* * * * *